Patented May 4, 1937

2,079,229

UNITED STATES PATENT OFFICE 2,079,229

PIGMENT PASTE FOR CARBON PAPERS, TYPEWRITER RIBBONS, AND STENCIL SHEETS

Walther Schrauth, Berlin-Dahlem, Germany, assignor, by mesne assignments, to "Unichem" Chemikalien Handels A.-G., Zurich, Switzerland, a corporation of Switzerland No Drawing. Application June 29, 1933, Serial No. 678,257. In Germany June 30, 1932

12 Claims. (Cl. 134—1)

Color pastes for use in the manufacture of duplicating papers, typewriter ribbons and stencil sheets are generally prepared by using fatty substances such as oils, fats or their free acids. Such fatty substances are subject to the disadvantage that they are not easily worked with the usual pigments of the industry since their dissolving or distributing capacity is limited and they require the use of so-called fat soluble pigments of a special character. Moreover preparations of the above character smear excessively when the duplicating paper, typewriter ribbons and the like are fresh but after storage they dry and the copying power deteriorates. Furthermore, the oleic acid generally employed in color pastes injures the rubber rolls of typewriters and like machines and in the course of time substantially destroys them.

It has now been found that the saturated and unsaturated mono- and poly-hydric high molecular aliphatic alcohols as well as the naphthenic alcohols and more particularly the ethers of these various alcohols as compared with the well-known heretofore used fat products show a considerable technical advantage when used in the preparation of color pastes for the duplicating and copying industry. These alcohols and ethers are good solvents for the pigments used. For this reason a smaller proportion of pigment can be used and the color pastes are more durable in use.

The fatty and naphthenic alcohols and their ethers are also stable against oxidation by the oxygen of the air so that they do not become rancid. Furthermore these materials are neutral and do not injure the paper, cloth, rubber or metal with which they come in contact. As examples of the above noted alcohols there may be mentioned stearyl alcohol, cetyl alcohol and oleyl alcohol, which last can be obtained from sperm oil, the ricinoleyl alcohol, the alcohols obtained from cocoa fat and linseed oil, and the naphthenic alcohols, all of which are commercially obtainable from the corresponding esters by catalytic reduction or by the method of Bouveault and Blanc. Instead of the pure alcohols, alcohol mixtures such as are commercially obtainable may be used. The ethers obtainable from these alcohols and suitable for the purposes of the present invention may be prepared according to the usual and well-known methods.

To produce ethers for use in accordance with the invention these alcohols may be etherified either with the same alcohols or with other aliphatic alcohols of lower or higher molecular weight. As examples of ethers used there may be mentioned di-cetyl ether, di-dodecyl ether, cetyl-octyl ether, dodecyl-butyl ether, di-naphthenyl ether and the like; also mono-ethers formed by etherifying such alcohols as mentioned above with low molecular poly-valent aliphatic alcohols such as glycol, glycerin or polyglycerins as, for example, glycol-mono-cetyl ether, glycerin-mono-cetyl ether and the like are excellent products for the purposes of the present invention. In order to obtain a better dispersion of color materials which are either insoluble or soluble with difficulty, especially in aqueous emulsions of wax pastes, it is desirable to add as a dispersing agent the salts of the sulfuric acid reaction products of high molecular aliphatic alcohols of fatty character or of the naphthenic alcohols, that is to say the sulfates and sulfonates produced by neutralization of the sulfuric acid esters or of the sulfonic acids of these alcohols with alkali or organic bases.

*Example 1.*—A mixture for use in the manufacture of duplicating papers which will be durable when stored may contain 30 parts by weight of crystal violet, 75 parts of alcohol, 130 parts of di-cetyl ether, 95 parts of oleyl alcohol and 50 parts of vaseline oil. This mixture may be applied to a thin tough silk paper such as used in the art.

*Example 2.*—A similar composition may contain 150 parts by weight of nigrosine, 125 parts of commercial lauryl alcohol, 200 parts of stearyl alcohol, 25 parts of lignite wax and 130 parts of paraffin oil. Instead of the lignite wax 40 parts of spermaceti or hydrogenized sperm oil may be substituted. Instead of the lauryl alcohol the same result may be obtained by substituting a corresponding amount of ricinoleyl alcohol such as obtained by the reduction of castor oil by the method of Bouveault and Blanc. See, for example, the German Patent #164,294 in which this reduction process is described.

*Example 3.*—Typewriter ribbons may be made in the following manner: 125 parts by weight of Berlin blue may be mixed with 15 parts of a neutralized aqueous 30% paste of oleyl alcohol sulfonate and this combined with 100 parts of dodecyl mono-glycerin ether to produce a homogenous composition. The ribbons may then be coated with this material.

*Example 4.*—A good color paste for the preparation of duplicating stencil sheets and the like may be obtained by grinding a homogenous mixture of 25 parts by weight of soot and 50 parts of naphthenic alcohols (boiling point at 20 mm.

pressure 120–150° C.) together with 100 parts of cetyl alcohol and 25 parts of oleyl alcohol to which mixture should be added a suitable amount of material such as beeswax, tragacanth, etc. to produce the desired consistency.

I claim:—

1. A color paste composition for use in the manufacture of duplicating papers, typewriter ribbons and stencil sheets comprising, as principal ingredients, color material and an ether wherein one radical attached to the oxygen atom is a radical of the group consisting of the normal primary aliphatic radicals having 8 or more carbon atoms and the naphthenic radicals and the other radical attached to the oxygen atom is a radical of the group consisting of the normal primary aliphatic and naphthenic radicals.

2. A color paste composition for use in the manufacture of duplicating papers, typewriter ribbons and stencil sheets comprising, as principal ingredients, color material and an ether wherein one radical attached to the oxygen atom is a normal primary aliphatic radical having 8 or more carbon atoms in the molecule and the other radical attached to the oxygen atom is a radical of the group consisting of the alkyl, alkylene, hydroxy-alkyl and hydroxy-alkylene radicals.

3. A color paste composition for use in the manufacture of duplicating papers, typewriter ribbons and stencil sheets comprising, as principal ingredients, color material and an ether wherein one radical attached to the oxygen atom is a normal primary aliphatic radical having 8 to 18 carbon atoms and the other radical attached to the oxygen atom is an aliphatic radical of the group consisting of the alkyl radicals having 4 to 18 carbon atoms and the glycol, glyceryl and poly-glyceryl radicals.

4. A color paste composition for use in the manufacture of duplicating papers, typewriter ribbons and stencil sheets comprising, as principal ingredients, color material and an ether wherein one radical attached to the oxygen atom is a normal primary aliphatic radical having 8 to 18 carbon atoms and the other radical attached to the oxygen atom is a glycol radical.

5. A color paste composition for use in the manufacture of duplicating papers, typewriter ribbons and stencil sheets comprising, as principal ingredients, color material and an ether wherein one radical attached to the oxygen atom is a normal primary aliphatic radical having 8 to 18 carbon atoms and the other radical attached to the oxygen atom is a hydroxy-alkyl radical.

6. A color paste composition for use in the manufacture of duplicating papers, typewriter ribbons and stencil sheets comprising, as principal ingredients, color material and an ether wherein one radical attached to the oxygen atom is a normal primary aliphatic radical having 8 to 18 carbon atoms and the other radical attached to the oxygen atom is a glyceryl radical.

7. A color paste composition for use in the manufacture of duplicating papers, typewriter ribbons and stencil sheets comprising, as principal ingredients, color material and an ether wherein one radical attached to the oxygen atom is a normal primary aliphatic radical having 8 to 18 carbon atoms and the other radical attached to the oxygen atom is a dihydroxy-alkyl radical.

8. A color paste composition for use in the manufacture of duplicating papers, typewriter ribbons and stencil sheets comprising, as principal ingredients, color material and an ether wherein one radical attached to the oxygen atom is a naphthenic radical and the other radical attached to the oxygen atom is a radical of the group consisting of alkyl and naphthenic radicals.

9. A color paste composition for use in the manufacture of duplicating papers, typewriter ribbons and stencil sheets comprising as principal ingredients color material and an ether of two alcohols, one an alcohol of the group consisting of octyl, dodecyl, stearyl and oleyl and the other an aliphatic alcohol of the group consisting of glycol, glycerin, poly-glycerin.

10. A color paste composition for use in the manufacture of duplicating papers, typewriter ribbons and stencil sheets comprising, as principal ingredients, color material and an ether wherein one radical attached to the oxygen atom is a radical of the group consisting of the normal primary aliphatic radicals having 8 or more carbon atoms and the naphthenic radicals and the other radical attached to the oxygen atom is a radical of the group consisting of the normal aliphatic and naphthenic radicals together with material of the group consisting of sulfates and sulfonates of aliphatic alcohols having 8 or more carbon atoms in the molecule.

11. A color paste composition for use in the manufacture of duplicating papers, typewriter ribbons and stencil sheets comprising, as principal ingredients, color material and an ether wherein one radical attached to the oxygen atom is a normal primary aliphatic radical having 8 to 18 carbon atoms and the other radical attached to the oxygen atom is an aliphatic radical of the group consisting of the alkyl radicals having 4 to 18 carbon atoms and the glycol, glyceryl and poly-glyceryl radicals together with material of the group consisting of sulfates and sulfonates of aliphatic alcohols having 8 or more carbon atoms in the molecule.

12. A color paste composition for use in the manufacture of duplicating papers, typewriter ribbons and stencil sheets comprising, as principal ingredients, color material and an ether wherein one radical attached to the oxygen atom is a normal primary aliphatic radical having 8 to 18 carbon atoms and the other radical attached to the oxygen atom is a hydroxy-alkyl radical together with material of the group consisting of sulfates and sulfonates of aliphatic alcohols having 8 or more carbon atoms in the molecule.

WALTHER SCHRAUTH.